US008869242B2

(12) United States Patent
Malinen et al.

(10) Patent No.: US 8,869,242 B2
(45) Date of Patent: Oct. 21, 2014

(54) AUTHENTICATION IN HETEROGENEOUS IP NETWORKS

(71) Applicant: Nokia Corporation, Espoo (FI)

(72) Inventors: Jari T. Malinen, Bejing (CN); Timothy J. Kniveton, San Francisco, CA (US); Meghana Sahasrabudhe, San Jose, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/679,804

(22) Filed: Nov. 16, 2012

(65) Prior Publication Data

US 2013/0074161 A1   Mar. 21, 2013

Related U.S. Application Data

(63) Continuation of application No. 10/960,641, filed on Oct. 8, 2004, now Pat. No. 8,341,700.

(60) Provisional application No. 60/510,787, filed on Oct. 13, 2003.

(51) Int. Cl.
| | |
|---|---|
| *H04L 29/06* | (2006.01) |
| *G06F 21/44* | (2013.01) |
| *H04W 80/00* | (2009.01) |
| *H04W 12/06* | (2009.01) |
| *H04W 12/02* | (2009.01) |
| *H04W 80/04* | (2009.01) |

(52) U.S. Cl.
CPC ............... *G06F 21/44* (2013.01); *H04L 63/08* (2013.01); *H04W 12/02* (2013.01); *H04L 63/0428* (2013.01); *H04W 80/00* (2013.01); *H04W 12/06* (2013.01); *H04W 80/04* (2013.01)
USPC ...... 726/3; 726/5; 726/14; 713/155; 713/168; 380/247

(58) Field of Classification Search
None
See application file for complete search history.

(56) References Cited

U.S. PATENT DOCUMENTS

2003/0119481 A1   6/2003  Haverinen et al.

OTHER PUBLICATIONS

Haverinen et al., "Cellular Access Control and Charging for Mobile Operator Wireless Local Area Networks", IEEE, Dec. 2002.
Jiang et al., "WLAN-Centric Authentication in INtegrated GPRS-WLAN Networks", IEEE, Oct. 9, 2003.
Morand et al., "Global Mobility Approach with Mobile IP in All IP Networks", IEEE, 2002.
Salkintzis et al., "WLAN-GPRS Integration for Next-Generation Mobile Data Networks", IEEE, Oct. 2002.
Yoo et al., "Efficient Integration of Mobile IPv6 over Wireless LAN Using Diameter in Roaming Environments, Electronic and Telecommunicaitons Research Institute", Aug. 2003.

(Continued)

*Primary Examiner* — Minh Dinh
(74) *Attorney, Agent, or Firm* — Mintz, Levin, Cohn, Ferris, Glovsky & Popeo, P.C.

(57) ABSTRACT

The invention proposes a system for authenticating and authorizing network services comprising: a mobile device being adapted to, upon receipt of an information message indicating at least one network access type, determine the network access type, to create a start message containing at least a user identity, and to encapsulate the start message in an authentication message compatible with the access network identified in the information message, and an access controller for reading the encapsulated message from the mobile and forwarding the encapsulated message to an authentication server identified in the encapsulated message. The invention also proposes a corresponding method for authenticating and authorizing network services, and an access control device, a subscriber device and a router device.

15 Claims, 10 Drawing Sheets

(56) References Cited

OTHER PUBLICATIONS

PCT Form ISA 210, PCT Notification of Transmittal of the International Search Report of the International Searching Authority, dated Jan. 19, 2005, issued in connection with corresponding PCT Application PCT/IB2004/003313.
Ylitalo et al., "Dynamic Network Interface Selection in Multihomed Mobile Hosts", IEEE Contribution, pp. 315-324, Jan. 6, 2003.
3GPP2 TSG-X: "cdma2000 Wireless Ip Network Standard: Introduction", 3GPP2 Standard, pp. 1-20, Aug. 2003, retrieved from the Internet <<http://www.3gpp2.org>>, retrieved on Jan. 4, 2005.
3GPP SA WG3: "Wireless Local Area Network (WLAN) Interworking Security (Release 6)", 3GPP Standard, pp. 1-48, Oct. 10, 2003, retrieved from the Internet <<http://www.3gpp.org>>, Jan. 4, 2005.
Arkko et al, "draft-arkko-pppext-eap-aka-10.txt: EAP AKA Authentication", IETF Standardworkingdraft, pp. 1-59, Jun. 2003.
Mahapatra et al., "Authentication in an integrated 802..1X based WLAN and CDMA420000-1X network", Communiaitons, 2003, APCC 2003, The 9th Aisa-Pacific Conference on Sep. 21-24, 2003, IEEE, vol. 1, pp. 227-231, Sep. 21, 2003.
3GPP2: "Removable User Identity Module (R-UIM) for cdma2000 Spread Spectrum Systems, Paragraph ANSI-41 based Authentication", 3GPP2 Standard, pp. 1-95, Jun. 9, 2000, retrieved from the Internet <<http://www.3gpp2.org>>, Jan. 4, 2005.
Patrik Flykt, C. Perkins, T. Eklund. AAA for IPv6 Network Access (work in progress). Internet Draft (draft-perkins-aaav6-04.txt), Internet Engineering Task Force, Jul. 2001.
3GPP2: Removable User Identity Module for Spread Spectrum Systems, C.S0023-0 v4.0, Jun. 2001.
P. Calhoun, H. Akhtar, J. Arkko, E. Guttman, A. Rubens, G. Zorn. Diameter Base Protocol (work in progress). Internet Draft (draft-ietf-aaa-diameter-08.txt), Internet Engineering Task Force, Nov. 2001.
H. Haverinen. EAP SIM Authentication (work in progress). Internet Draft (draft-haverinen-pppext-eap-sim-10.txt), Internet Engineering Task Force, Feb. 2003.
J. Arkko, H. Haverinen. EAP AKA Authentication (work in progress). Internet Draft (draft-arkko-pppext-eap-aka-10.txt), Internet Engineering Task Force, Jun. 2003.
L. Blunk. J. Vollbrecht. PPP Extensible Authentication Protocol (EAP). RFC 2284, Internet Engineering Task Force, Mar. 1998.
GSM 02.60 V8.1.0: "Digital cellular telecommunications system (Phase 2+); General Packet Radio Service (GPRS); Service Description, Stage 1". European Telecommunications Standardization Institute (ETSI), Jul. 1999.
A. Conta, S. Deering. Internet Control Message Protocol (ICMPv6) for the Internet Protocol Version 6 (IPv6) Specification. RFC 2463, Internet Engineering Task Force, Dec. 1998.
D. Johnson, C. Perkins. Mobility Support in IPv6 (work in progress). Internet Draft (draft-ietf-mobileip-ipv6-21.txt), Internet Engineering Task Force, Feb. 2003.
B. Aboba, M. Beadles. The Network Access Identifier. RFC 2486, Internet Engineering Task Force, Jan. 1999.
P. Calhoun, W. Bulley, A. Rubens, J. Haag, G. Zorn. Diameter NASREQ Application (work in progress). Internet Draft (draft-ietf-aaa-diameter-nasreq-08.txt), Internet Engineering Task Force, Nov. 2001.
3GPP2: Wireless IP Network Standard, P.S0001-B v1.0.0, Oct. 2002.
3GPP2: Cellular Radiotelecommunications Intersystem Operations, N.50005-0, Apr. 2002.
TIA/EIA-95-B Standard: Mobile Station Base-Station Compatibility Standard for Wideband Spread Spectrum Cellular Systems, Feb. 1999 (TIA-EIA-95-b-1999[1].pdf).
T.J. Kniveton, J. Malinen. SIM authentication over IPv6 (work in progress). Internet Draft (draft-kniveton-sim6-02.txt), Internet Engineering Task Force, Mar. 2003.

AUTHENTICATION IN HETEROGENEOUS IP NETWORKS

CROSS REFERENCE TO RELATED APPLICATIONS

This application is a continuation application of U.S. patent application Ser. No. 10/960,641, filed Oct. 8, 2004, and entitled "AUTHENTICATION IN HETEROGENEOUS IP NETWORKS", which claims priority of U.S. Provisional Patent Application Ser. No. 60/510,787, filed on Oct. 13, 2003, and entitled "AUTHENTICATION IN HETEROGENEOUS IP NETWORKS". The contents of all of the aforementioned applications are hereby incorporated by reference in their entirety.

BACKGROUND OF THE INVENTION

1. Field of the Invention

This invention relates to a system and a method for authenticating and authorizing network services.

2. Description of the Related Art

In future 3G (third generation) system architectures, network services may be provisioned through many different network access methods, for example CDMA2000 (Code Division Multiple Access, version 2000), non-cellular IP based network, 802.11 Wireless LAN (Local Area Network), Bluetooth, or Ethernet. However, in 3GPP2 mobile devices are currently only able to access network services using CDMA2000 access methods. Therefore, in order to more reliably and efficiently provision network services there is a need to allow mobile devices the ability to authenticate through different types of access networks so that different access networks can authorize services.

There is no one universal authentication process for authenticating a user (terminal) in any kind of network access technology. And this makes gaining access and mobility of sessions difficult in a multi-access scenario. A message exchange is needed between the network and the mobile station, to allow service provisioning in a generic IP network, cellular or non-cellular, for using the same authority. However, there is a problem that the terminal needs to use some other method to authenticate itself with the operator's network and receive service if it is not using the CDMA2000 cellular network.

Similar problems occur, when a R-UIM chip is used which holds a users identify for mobile cellular phone use in CDMA networks, similar to how SIM (Subscriber Identity Module) cards hold a user's identity in GSM (Global System for Mobile communication) networks. The R-UIM is described in 3GPP2 document C.S0023-0.

For example, if the terminal is using a WLAN (Wireless LAN) or Bluetooth radio for its connections, e.g., to the Internet, and using the same registration identity from the R-UIM module, it needs a separate non-cellular protocol to achieve this, which is the problem this application addresses.

SUMMARY OF THE INVENTION

Thus, the object underlying the present invention resides in providing a possibility for a mobile device to authenticate through different types of access networks.

This object is solved by a system for authenticating and authorizing network services comprising:

a mobile device, said mobile device being configured to determine a network access type upon receipt of an information message indicating at least one network access type;

create a start message containing at least a user identity; and encapsulate the start message in an authentication message compatible with an access network identified in the information message, said system further comprising:

an access controller for reading the encapsulated message from the mobile device and forwarding the encapsulated message to an authentication server identified in the encapsulated message.

Alternatively, the above object is solved by a method for authenticating and authorizing network services, wherein the network comprises a mobile device and an authentication controlling function, the method comprising the steps of:

determining a network access type by the mobile device, upon receipt of an information message indicating at least one network access type;

creating a start message containing at least a user identity, encapsulating the start message in an authentication message compatible with an access network identified in the information message, and reading, by an access controller, the encapsulated message from the mobile device and forwarding the encapsulated message to an authentication server identified in the encapsulated message.

Thus, according to the invention the mobile device receives information regarding a network access type (this information message may be an explicit message sent to the mobile device or may be information which is generally available in the network). The mobile device creates a start message containing the user identity and sends it in an authentication message to an access controller. The access controller evaluates the start message and forwards it to the correct authentication server.

Hence, the mobile device needs to address only one access controller, which forwards the authentication message to the correct authentication server. That is, it is not necessary for the mobile device to find out how the authentication server is to be reached.

Moreover, also a plurality of authentication server for different services may be provided. According to the prior art as described above, the mobile device would have to send a plurality of authentication messages to all different authentication servers the services of which are to be used. In contrast thereto, according to the present invention, the mobile device only has to send one start message in which a plurality of authentication messages corresponding to the authentication servers are encapsulated.

Hence, the authentication procedure is simplified. In addition, also the traffic load on the network is reduced since only one single start message is required although a plurality of services is to be used.

Furthermore, a router for issuing the information message may be provided, wherein the information message includes a router advertisement.

The information message may indicates extensible authentication protocol (EAP) support.

The information message may be issued when the mobile device enters a network.

The start message may contain a client identifier option message and a extensible authentication protocol support identity option message, wherein said messages contain information regarding at least one of client type, user identity, and information on how to address the client inside the core IP network (referred to in the following also as core address information).

A protocol between the mobile device and the access network may comprise at least one of network layer protocols like UDP, ICMP, ICMPv6 or link-layer protocols like IEEE 802.1x, IEEE 802.11i, and a Bluetooth profile.

An authentication mechanism applied may comprise an extensible authentication protocol (EAP).

An authentication mechanism applied may be an authentication mechanism using a removable user identity module (R-UIM) applying a Cellular Authentication and Voice Encryption (CAVE) algorithm, or a USIM applying the AKA algorithm The invention also suggests a system for authenticating and authorizing network services, said system comprising: mobile device means, said mobile device means for determining a network access type upon receipt of an information message indicating at least one network access type, for creating a start message containing at least a user identity, and for encapsulating the start message in an authentication message compatible with an access network identified in the information message; and access controller for reading the encapsulated message from the mobile device means and for forwarding the encapsulated message to an authentication server identified in the encapsulated message.

Furthermore, the present invention proposes a system for authenticating and authorizing network services, wherein the network comprises a mobile device and an authentication controlling function, wherein the mobile device comprises determining means for determining a network access type by the mobile device, upon receipt of an information message indicating at least one network access type;

creating means for creating a start message containing at least a user identity; and encapsulating means for encapsulating the start message in an authentication message compatible with an access network identified in the information message; and the access controller means comprises reading means for reading the encapsulated message from the mobile device and for forwarding the message to an authentication server identified in the encapsulated message.

In this connection, it is noted that the message read by the access controller is encapsulated in another type of message, which the access controller will consequently send to the authentication server.

The invention also proposes an access control device comprising:

a receiving means for receiving a start message in which an authentication message is encapsulated, a processing means for reading the encapsulated message, and a forwarding means for forwarding the encapsulated message to an authentication server identified in the encapsulated message.

Also, in this case the message read by the access controller may be encapsulated in another type of message to send to the authentication server.

Furthermore, the invention proposes a subscriber device comprising:

determining means for determining a network access type upon receipt of an information message indicating at least one network access type;

creating means for creating a start message containing at least a user identity;

encapsulating means for encapsulating the start message in an authentication message compatible with an access network identified in the information message; and sending means for sending the start message to an access control device.

In addition, the invention proposes a router device comprising creating means for creating an information message indicating at least one network access type, and sending means for sending the information message to a subscriber device.

DETAILED DESCRIPTION OF THE PREFERRED EMBODIMENTS

Figure 1:
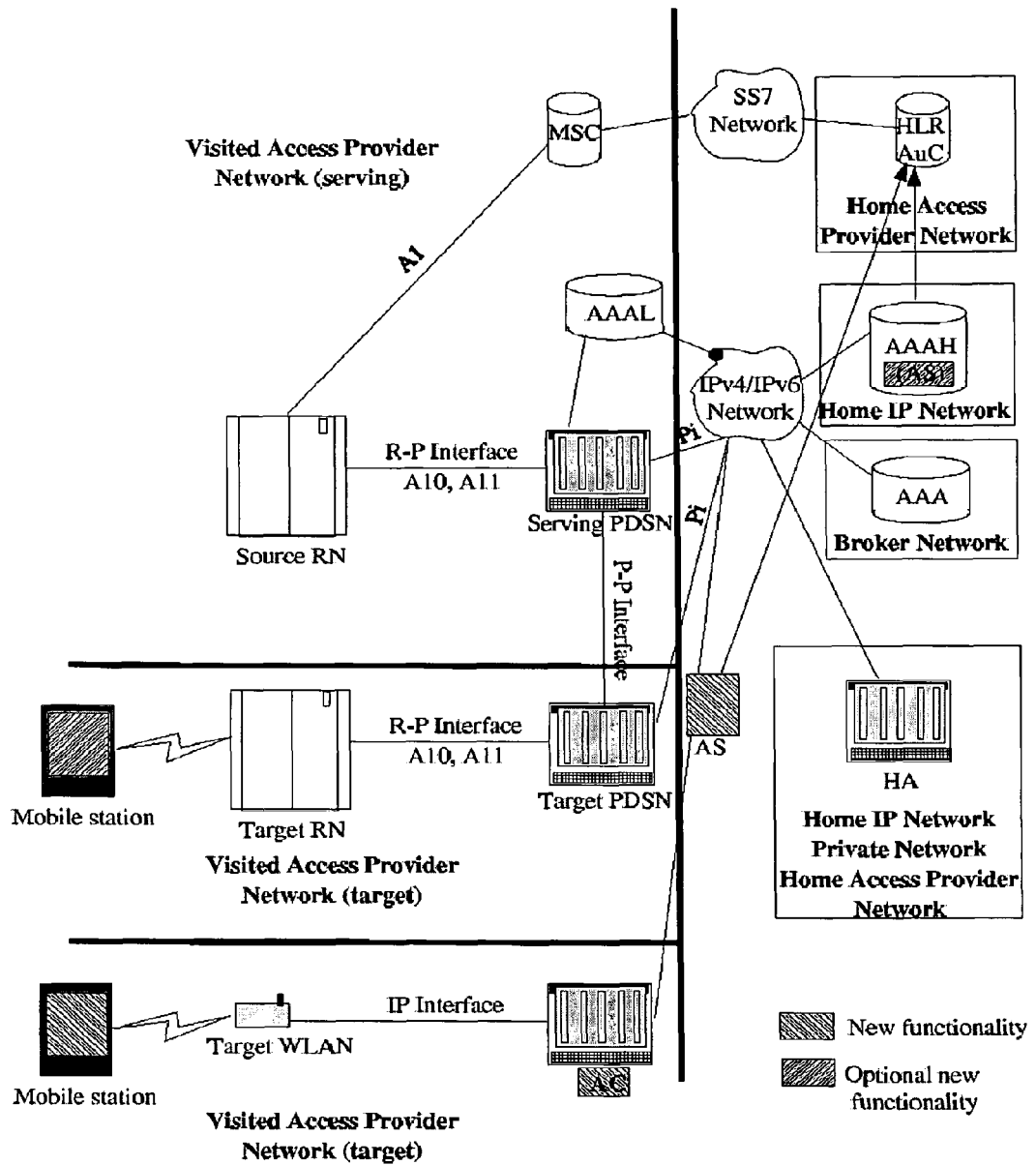
FIG. 1 shows a CDMA2000 multi-access network reference model according to the embodiments of the invention.

As described above, according to the invention a system for authenticating and authorizing network services is provided, which comprises: a router for issuing a router advertisement containing indicating network access type and extensible authentication protocol support; a mobile device that upon receipt of the router advertisement determines the network access type and creates a start message containing an client identifier option message and a EAP (Extensible Authentication Protocol) identity option message, which contain client type, user identity, and core address information, further encapsulates the start message in an IPv4 or IPv6 protocol compatible with access network identified in the router advertisement, for example UDP, ICMPv6 (Internet Control Message Protocol version 6 (for IPv6)), or a link layer protocol like IEEE 802.1x, IEEE 802.11i, or a suitable Bluetooth profile, and an access controller for reading the encapsulated message from the mobile and forwarding the encapsulated message to an authentication server identified in the encapsulated message.

Several authentication mechanisms may be used. In the following description of the preferred embodiments, EAP-AKA (Authentication and Key Agreement) authentication mechanism using USIM (Universal Subscriber Identity Module) (first embodiment) and an authentication mechanism using R-UIM (removable user identity module) applying a CAVE (Cellular Authentication and Voice Encryption) algorithm (second embodiment) are taken as examples.

A first embodiment relates to a combined use of CDMA2000 cellular and non-cellular packet data networks, and specifically relates to user authentication and the authorization of services using a Universal Subscriber Identity Module (USIM) when communicating over multiple types of access networks using the EAP-AKA specification. This capability is useful for automating key management leveraging on existing key infrastructure for non-data authentications, as has been shown with similar methods in other cellular environments. Authenticating the user and authorizing service allows the cellular operator to provide the user various access network types, while maintaining a unified service provisioning, user-based network access management, and roaming authorization, while leveraging all this from existing authentication/accounting/billing infrastructure. The benefit can be summarized as unification of smartcard-based CDMA2000 authentication for multiple access methods.

The embodiment describes one way of network access, mobility signaling, and other services authentication for WLAN/CDMA2000 users. In particular, according to the first embodiment a multi-access scheme is provided where the network authentication from WLAN, as well as mobility management signaling protection, uses the special combination of AAAv6 (Authentication, Authorization and Accounting for Ipv6), EAP-AKA (Extensible Authentication Protocol Authentication and Key Agreement), and Radius protocols, as well as the CDMA2000 specific multi-access architecture for the presented method.

As described above, according to the first embodiment the problem is to be solved that the terminal needs to use some other method to authenticate itself with the operator's network and receive service if it is not using the CDMA2000 cellular network. According to the present embodiment the problem is overcome by defining a method to authenticate a user using the EAP-AKA specification to run over any access and core technology as long as the user has a USIM that holds the user's identity, as will be described in the following in detail.

According to the first embodiment, the EAP-AKA authentication mechanism (as defined in J. Arkko, H. Haverinen. EAP AKA Authentication (work in progress), Internet Draft (draft-arkko-pppext-eap-aka-10.txt), Internet Engineering Task Force, June 2003, for example) is applied to authenticate a user to the network using any network access technology. Thus, a mutual authentication, network authorization, and service provisioning by a multi-party interaction involving (but not limited to) the following entities is achieved: terminal, USIM (Universal Subscriber Identity Module), Access Controller, Authentication Gateway, and the CDMA2000 network's Authentication Center (AuC/HLR (Home Location Register, the AuC is located in the HLR)). In the following, it is described in detail how this can be achieved.

FIG. 1 shows a CDMA2000 Multi-access network reference model, in which in particular also the Access controller (AC) and the Authentication Server (AS) are provided.

In the upper left part of FIG. 1, a visited access provider network (in particular, the serving network) is shown. A source radio network (RN) is connected to a serving PDSN via a RAN-PDSN interface (R-P interface). A 10 and A11 are interfaces for control messages defined in CDMA2000. The PDSN (Packet Data Serving Network) acts as a foreign agent, and provides access to the Internet, intranets, and Wireless Application Protocol (WAP) servers for mobile stations and the like. The source RN is also connected to a Mobile Services Switching Center (MSC) via an interface A1.

The MSC is connected to the home access provider network of the mobile station via an SS7 network. The home access provider network comprises a Home Location Register (HLR) and an Authentication Center (AuC), which is needed according to the embodiments described in the following.

In the middle left part of FIG. 1, a target visited access provider network is shown, to which a mobile station may be connected. The target access provider network comprises a target RN and a target PDSN, which are connected by an R-P interface similar as in the serving visited access provider network. Both PDSN are also connected to an IP network (Internet Protocol version 4 (Ipv4) and/or Internet Protocol version 6 (Ipv6)). For this connection, an interface Pi is defined in CDMA2000. The serving PDSN is also connected to an AAAL (Local AA (Authentication, Authorization and Accounting)) server, which also has access to the IP network.

On the right side of FIG. 1, the home access provider network described above, a home IP network connected to the IP network and comprising an AAAH (Home AAA), and a broker network comprising an AAA server is shown. Furthermore, the Home Agent (HA) is illustrated, which may be arranged in the home IP network, in a private network or in the home access provider network.

A further access possibility for the mobile station is shown in the lower left part of FIG. 1, in which a further target visited access provider network is illustrated. This is the scenario for the embodiments described in the following. Here, the mobile station connects to a target WLAN (Wireless Local Area Network). The WLAN is connected via an IP interface to an Access Controller (AC) which will be described in more detail later. The AC is connected to an Access Server (AS), which provides a connection to the IP network and also to the home access provider network, in particular to the AuC of the home access provider network.

The new functionalities (i.e., the devices comprising the new functionalties) according to the embodiments described in the following are indicated by hatched boxes. That is, these new functionalities are in the AC and the AS. Moreover, optionally the AS may be provided in the AAAH of the home IP network.

The terminal is a device that needs to be capable of gaining access to all kinds of IP networks, including the IP network that is part of the cellular network and also the OWLAN (Operator Wireless LAN) access network. The terminal also needs to be able to run the AKA algorithms by having a USIM. And it also needs to run the IPv6 protocol. If MIPv6 is used, this process can also be utilized to dynamically create Security Associations between the Home Agent and the terminal. The EAP-AKA specification shows how the AKA authentication can be carried out using EAP messages. According to this embodiment, it is described how this specification can be used for authentication regardless of the access technology.

At the time the terminal enters a network capable of this functionality, it receives a Router Advertisement (RA), which includes an indication of support, e.g., a router or agent advertisement option from the local AC (Access controller) indicating this type of AAA (Authentication, Authorization and Accounting) support. This initiates the authentication, key generation, and service provisioning according to the present embodiment.

The EAP messages are encapsulated in either AAAv6 messages or in the WLAN link-layer (such as in IEEE 802.1x, IEEE 802.11i or in a suitable Bluetooth profile message, in PPP EAP encapsulation, or in any suitable last-hop PANA protocol message, as standardized in the future) when they are exchanged between the terminal and the access controller, which is the network element responsible for controlling the access of users to the IP network. If AAAv6 is used, the initial EAP/AKA identity message goes in the EAP Identity option in the AAAv6 message.

Between the access controller and the Authentication Server, the EAP messages are carried in a core network protocol like Diameter or Radius. The AC determines the Authentication Server's IP address by mapping it from the IMSI (International Mobile Subscriber Identity) and realm. The Authentication Server has a logical interface to the HLR/Authentication Center (AuC) through the MSC. It acts as a gateway between the MAP protocol (SS7 network) and the authentication protocols used on IP.

A scenario for authenticating the user in an OWLAN network according to the present embodiment is described in the following with message flows.

1. The terminal sends an access request message (which could be an AAAv6 Request message or any other message to request network access) to the access controller. The EAP Response/AKA Identity message is embedded in this message. Also, there needs to be a provision to pass the user NAI in this message.

2. The access controller fetches the EAP message and puts it into a request message (which could be a Diameter AA Request message or a Radius Access Request message) sent in the core network to the Authentication Server (AS). For example, in Diameter the EAP message would be in the EAP payload AVP. The access controller figures out which AS the request should go to, based on the realm part of the user NAI.

3. On receiving the message the AS first identifies the AuC holding the authentication information for the user. This could be based on the user part of the user NAI. For example, if the user NAI used is of the form IMSI@realm, then the IMSI can be used to identify the user HLR/AuC. It requests the UNITS authentication quintet from the AuC. This quintet consists of five values, namely, a) a network challenge RAND, b) an expected user response XRES, c) a cipher key CK, d) an integrity key IK and e) a network authentication token AUTN. On getting these values it creates the attributes AT_RAND (a random number), the AT_AUTN (an authorization vector) and AT_MAC (message authentication code). It calculates and stores the value AT_RES for later usage. It creates the EAP Request/AKA/Challenge message containing the AT_RAND value, the AT_AUTN value, and the AT_MAC value. Lastly, it sends a message, containing the EAP Request/AKA/Challenge message in it and the NAI identifying the user (in the User-Name attribute), to the AC. The message could be a Diameter AA Answer message or a Radius Access Challenge message. If it is a Diameter message, the EAP message is carried in the EAP payload AVP.

4. The AC sends a message to the terminal containing the EAP Request/AKA/Challenge. This can be an AAAv6 message or any other network access protocol in use between the terminal and the access controller.

5. When the terminal receives this message, it first extracts the EAP Request/AKA/Challenge message. It then uses the AKA to calculate the AT_RES values, giving the AT_RAND and AT_MAC values received inside the EAP Request/AKA/Challenge as input to the AKA. It also calculates the AT_AUTN value and compares it to the AT_AUTN received in the EAP Request/AKA/Challenge. If these values match, the EAP Request/AKA/Challenge message is authenticated successfully, otherwise the message authentication fails. If the values have matched, it creates and sends a message (AAAv6) to the AC containing the EAP Response/AKA/Challenge message. The EAP Response/AKA/Challenge message contains the calculated AT_RES value.

6. The AC sends a request message again (Diameter AA Request/Radius Access Request). This time it contains the EAP Response/AKA/Challenge.

7. When the AS receives this message, it compares the AT_RES value it had computed earlier with the AT_RES value in the received EAP message. If the values match, the AKA authentication is successful; otherwise, the authentication fails. Depending on the result, it either sends an Access Accept or an Access Reject message (in case of Radius). For Diameter it sends an AA Answer message with the result in the Result-Code AVP.

8. On receipt of this message, the AC knows if the authentication was successful or not. The Ac sends the appropriate reply message to the terminal. When the terminal receives this message, the OWLAN access network authentication is complete. If the authentication was successful, the AC shall apply a filtering rule allowing packets sent from the authenticated terminal to pass.

Figure 2A:
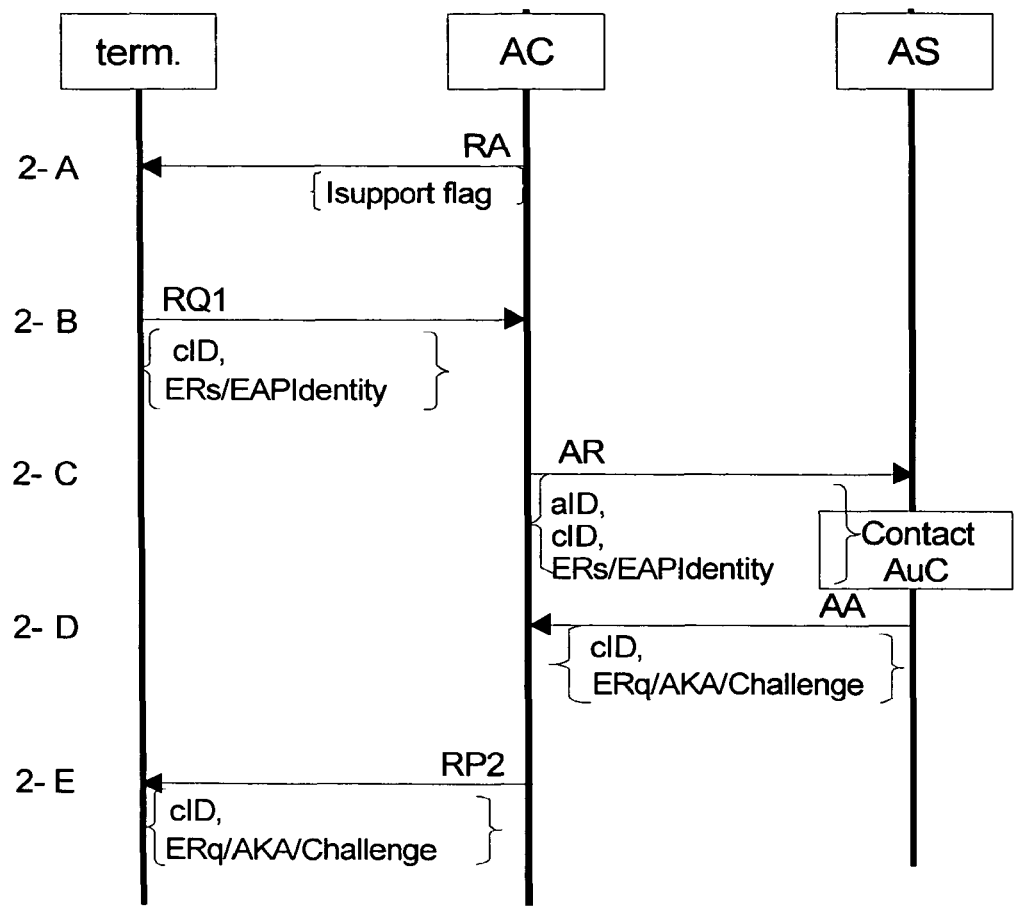
FIGS. 2A and 2B a signal flow according to a first example of a first embodiment of the invention.
Figure 2B:
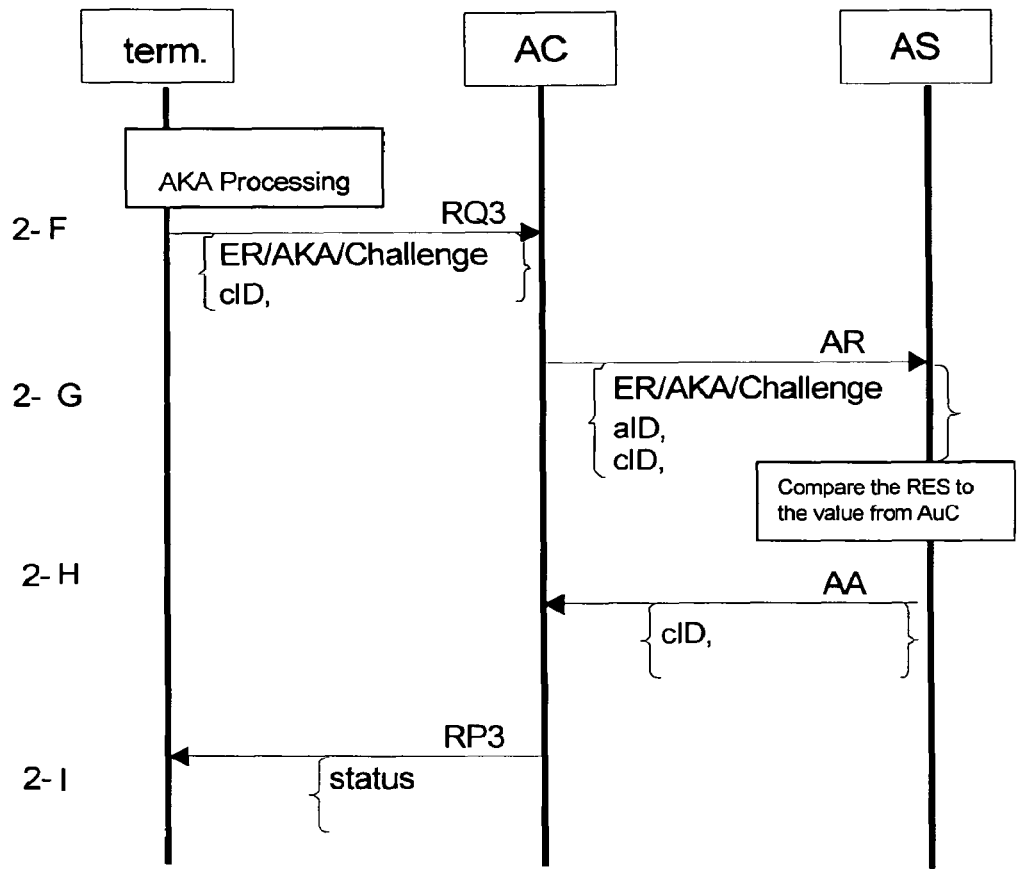

Next, the above procedure is described in some more detail by referring to the signal flow diagram shown in FIGS. 2A and 2B. The signal flow diagram illustrates the signals exchanged between the terminal (term., i.e. the UE), the Authentication Center (AC) and the Authentication Server (AS).

In step 2-A, the terminal receives a Router Advertisement (either unsolicited or solicited) from the AC. The Router Advertisement (RA) includes the AAA Challenge Option containing the Local Challenge. Before sending the following message, the terminal must have acquired an assigned IP address (in case of an IPv4 address from, for example, a DHCP (Dynamic Host Configuration Protocol) server. In case of an IPv6 address it could be an autoconfigured address).

In step 2-B, the terminal deducts from the presence of an AAA flag in the Router Advertisement that AAA access authentication needs to be performed. The terminal starts the authentication sequence by sending an AAA Request message (indicated by RQ1) to the AC. The AAA Request contains an AAA Client Identifier Option (indicated in the signal flow diagram as cID) as well as an option carrying the EAP Identity message. Both the AAA Client Identifier Option and the EAP Identity message contain the NAI of the user (IMSI@realm).

In step 2-C, the AC derives the address of the AS from the NAI contained in the AAA Client Identifier Option (using DNS, if needed) and sends a AAA-Request (AR) message to the AS. The AR contains the EAP Identity message (in the EAP-Payload attribute) and the NAI (in the User-Name attribute) received in the AAA Client Identifier Option in step B.

In step 2-D, the AS performs the following upon receipt of the AR message in step 2-C:

Based on the IMSI part of the NAI, the AS identifies the AuC holding the authentication information for the user.

It asks and gets a UMTS authentication quintet from the AuC. It consists of 5 values:

a) a network challenge RAND, b) an expected user response XRES, c) a cipher key CK, d) an integrity key IK and e) a network authentication token AUTN.

It calculates the values AT_RAND (a random number), the AT_AUTN (an authorization vector) and AT_MAC (message authentication code).

It calculates and stores the value AT_RES for later usage (derived from XRES).

It creates the EAP Request/AKA/Challenge message containing the AT_RAND value, the AT_AUTN value, and the AT_MAC value.

It sends an Access-Challenge (AA) message, containing the EAP Request/AKA/Challenge (in the 3GPP2 vendor-specific attribute) and the NAI identifying the user (in the User-Name attribute), to the AC.

In step 2-E, the AC sends an AAA Reply message (RP2), containing the EAP Request (ERq in the signal flow diagram)/AKA/Challenge in the AAAv6 Embedded Data Option, an AAA Client Identifier Option containing the NAI and an AAAv6 Challenge Option, to the terminal. The AAAv6 Challenge Option contains a Local Challenge value set by the AC.

In step 2-F, the terminal performs the following upon receipt of the AAA Reply in step 2-E:

It uses the AKA to calculate the AT_RES values, giving the AT_RAND and AT_MAC values received inside the EAP Request/AKA/Challenge as input to the AKA.

It calculates the value AT_AUTN as specified in AKA.

It compares the calculated AT_AUTN value to the value received in the EAP Request/AKA/Challenge. If the values match, the EAP Request/AKA/Challenge message is authenticated successfully, otherwise the message authentication fails.

It sends an AAA Request message (RQ3), containing the Local Challenge in an AAAv6 Challenge Option, an AAA Client Identifier Option (NAI of the form IMSI@realm) and an EAP Response (ER)/AKA/Challenge message in the AAAv6 Embedded Data Option, to the AC. The EAP Response/AKA/Challenge contains the calculated AT_RES value.

In step 2-G, the AC sends an AAA Request (AR) message to the AS (identified by the NAI). The AR message contains the EAP Response/AKA/Challenge (in the 3GPP2 vendor-specific attribute) and the NAI (in the User-Name attribute) received in the AAA Client Identifier Option of the AAA Request.

In step 2-H, the AS performs the following upon receipt of the AR message in step 2-G:

It compares the AT_RES value it has calculated in step D to the AT_RES value contained in the EAP Response/AKA/Challenge. If the values match, the AKA authentication is successful; otherwise, the authentication fails.

If authentication is successful, it sends an AA message, containing the NAI identifying the user (in the User-Name attribute) to the AC. If authentication has failed then it sends the Access-Reject Message to the AC.

In step 2-I, the AC knows upon receipt of the AA message in step 2-H that the AKA authentication was successful. The AC sends an AAA Reply message (indicated by RP3 in FIG. 2A) with the Code field set to indicate SUCCESS (value 0), to the terminal. When the terminal receives this message, the OWLAN access network authentication is accomplished. If the authentication was successful, the AC shall apply a filtering rule allowing packets sent from the authenticated terminal to pass.

In the following, it is described how the generalized authentication establishment is done for mobility bindings according to the first embodiment.

1. The sequence starts with the terminal sending a request message (AAAv6, WLAN link-layer or any other network access protocol) to the Home Agent (HA). The request contains the NAI of the user (IMSI@realm) as well as an embedded EAP Response/AKA/Identity message.

2. The HA fetches the EAP message and puts it into a request message (which could be a Diameter AA Request message or a Radius Access Request message) sent in the core network to the Authentication Server (AS). For example, in Diameter the EAP message would be in the EAP payload AVP. The HA figures out which AS the request should go to based on the realm part of the user NAI, since the realm part of the NAI indicates the domain where the AS resides.

3. On receiving the message the AS first identifies the AuC holding the authentication information for the user. This could be based on the user part of the user NAI. For example, if the user NAI used is of the form IMSI@realm, then the IMSI can be used to identify the user HLR/AuC. It requests the UMTS authentication quintet from the AuC. This quintet consists of five values, namely, a) a network challenge RAND, b) an expected user response XRES, c) a cipher key CK, d) an integrity key IK and e) a network authentication token AUTN. On getting these values it creates the attributes AT_RAND (a random number), the AT_AUTN (an authorization vector) and AT_MAC (message authentication code). It calculates and stores the values AT_RES and the session key K for later usage. It creates the EAP Request/AKA/Challenge message containing the AT_RAND value, the AT_AUTN value, and the AT_MAC value. Lastly, it sends a message, containing the EAP Request/AKA/Challenge message in it and the NAI identifying the user (in the User-Name attribute), to the HA. The message could be a Diameter AA Answer message or a Radius Access Challenge message. If it is a Diameter message, the EAP message is carried in the EAP payload AVP.

4. The HA sends a message to the terminal containing the EAP Request/AKA/Challenge. This can be a AAAv6 message or any other network access protocol in use between the terminal and the access controller.

5. When the terminal receives this message, it first extracts the EAP Request/AKA/Challenge message. It then uses the AKA to calculate the AT_RES values, giving the AT_RAND and AT_MAC values received inside the EAP Request/AKA/Challenge as input to the AKA. It then calculates the value K. It also calculates the AT_AUTN value and compares it to the AT_AUTN received in the EAP Request/AKA/Challenge. If these values match, the EAP Request/AKA/Challenge message is authenticated successfully, otherwise the message authentication fails. If the values have matched, it creates and sends a message (AAAv6) to the HA containing the EAP Response/AKA/Challenge message. The EAP Response/AKA/Challenge message contains the calculated AT_RES value. The terminal stores the value K for using it in future for the Security Association (SA) with the HA.

6. The HA sends a request message again (Diameter AA Request/Radius Access Request). This time it contains the EAP Response/AKA/Challenge.

7. When the AS receives this message, it compares the AT_RES value it had computed earlier with the AT_RES value in the received EAP message. If the values match, the AKA authentication is successful; otherwise, the authentication fails. Depending on the result, it either sends a Access Accept or a Access Reject message (in case of Radius). For Diameter it sends a AA Answer message with the result in the Result-Code AVP. It also sends a Key-Distribution AVP as it needs to convey the BU authentication key to the HA and the Authorization Lifetime AVP which has the associated lifetime of the BU authentication key.

8. On receipt of this message, the HA knows if the authentication was successful or not. It creates a Security Association with the terminal for the purpose of authenticating the Binding Updates. It associates the authentication key K with this SA and initializes the lifetime of it as received in the message. The HA sends the appropriate reply message to the terminal. When the terminal receives this message, the BU authentication key establishment is complete.

Figure 3A:
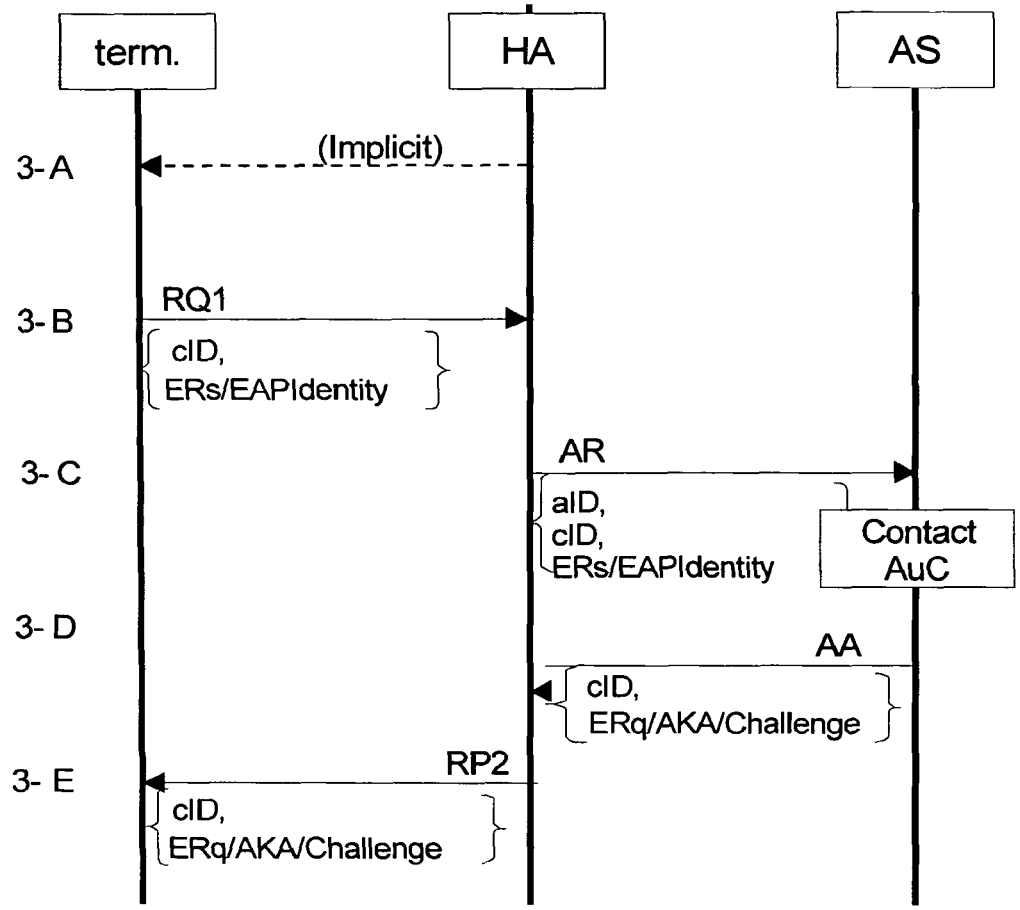
FIGS. 3A and 3B a signal flow according to a second example of the first embodiment of the invention.
Figure 3B:
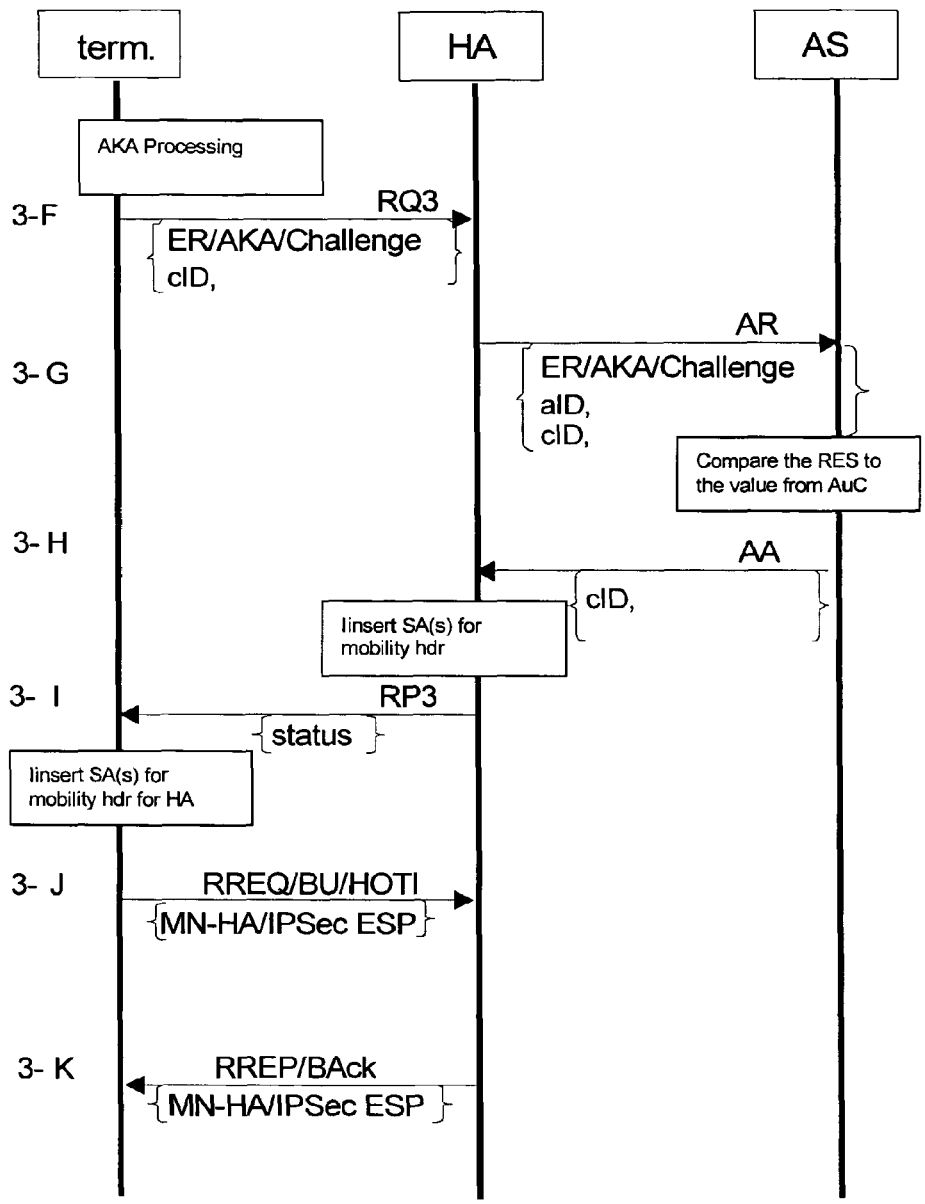

In the following, the above procedure is described in more detail by referring to the signal flow diagram shown in FIGS. 3A and 3B.

In step 3-A, the terminal implicitly receives a knowledge of its HA being able to perform a AKA authentication. Before sending the following message, the terminal must have acquired an assigned IPv4 address, e.g., with DHCP.

In step 3-B, the terminal deducts from its static knowledge with its home network that binding authentication needs to be performed. The terminal starts the authentication sequence by sending an AAA Request message (indicated by RQ1 in FIG.

3A) to the HA. The AAA Request contains an AAA Client Identifier Option (cID) as well as an option carrying the EAP response and EAP Identity message (ERs/EAPIdentity). Both the AAA Client Identifier Option and the EAP Identity message contain the NAI of the user (IMSI@realm).

In step 3-C, the HA derives the address of the AS from the NAI contained in the AAA Client Identifier Option (using a dynamic name server (DNS), if needed) and sends an AAA-Request (AR) message to the AS. The AR contains the EAP Identity message (in the EAP-Payload attribute) and the NAI (in the User-Name attribute) received in the AAA Client Identifier Option in step B.

In step 3-D, the AS performs the following upon receipt of the AR message in step 3-B:

It notes from the Reason field of the EAP Response/Identity that the session key established with this procedure will be used for Client-Attendant authentication (so it does not have to send the key later on to any other HA than the one acting as the attendant).

Based on the IMSI part of the NAI, the AS identifies the AuC holding the authentication information for the user.

It asks and gets a UNITS authentication quintet from the AuC.

It calculates the values AT_RAND (a random number) and AT_AUTN (an authorization vector) and AT_MAC (message authentication code).

It calculates and stores the values AT_RES and K for later usage.

It creates the EAP Request/AKA/Challenge containing the AT_RAND value, the AT_AUTN value, and the AT_MAC value.

It sends an Access-Challenge (AC) message, containing the EAP Request/AKA/Challenge (in the 3GPP2 vendor-specific attribute) and the NAI identifying the user (in the User-Name attribute), to the HA.

In step 3-E, the HA sends an AAA Reply message (indicated by RP2 in the figure), containing the EAP Request/AKA/Challenge in the AAAv6 Embedded Data Option, an AAA Client Identifier Option and an AAAv6 Challenge Option, to the terminal. The AAA Client Identifier Option contains the NAI identifying the user and the AAAv6 Challenge Option contains a Local Challenge value set by the HA.

In step 3-F, the terminal performs the following upon receipt of the AAA Reply in step 3-E:

It uses the AKA to calculate the AT_RES value and the K value giving the AT_RAND value received inside the EAP Request/AKA/Challenge as input to the AKA.

It compares the calculated AT_AUTN value to the value received in the EAP Request/AKA/Challenge. If the values match, the EAP Request/AKA/Challenge message is authenticated successfully, otherwise the message authentication fails.

It stores the key K for the purpose of using it for the Security Association with the HA.

It stores the lifetime of the Security Association with the HA in order to be able to deduct, when it must be renewed.

It sends an AAA Request message (RQ3), containing the Local Challenge in an AAAv6 Challenge Option, an AAA Client Identifier Option (NAI of the form IMSI@realm) and an EAP Response/AKA/Challenge message in the AAAv6 Embedded Data Option, to the HA. The EAP Response/AKA/Challenge contains the calculated SRES value.

In step 3-G the HA sends an AR message to the AS (identified by the NAI). The AR message contains the EAP Response/AKA/Challenge (in the 3GPP2 vendor-specific attribute) and the NAI (in the User-Name attribute) received in the AAA Client Identifier Option.

In step 3-H, the AS performs the following upon receipt of the AR message in step 3-F:

It compares the AT_RES value it has calculated in step 3-C to the AT_RES value contained in the EAP Response/AKA/Challenge. If the values match, the AKA authentication is successful, otherwise the authentication fails.

It sends a AA message to the HA. The AA message contains the BU authentication key in a vendor-specific attribute, the NAI identifying the user in the User-Name attribute and the BU authentication key lifetime in another vendor-specific attribute. The key lifetime field is set by the AS to the value 259200 (3 days), for example.

In step 3-I: the HA creates or renews the Security Association to be used with the terminal for authenticating the Binding Updates, associates the key K as the authentication key with it and initializes the lifetime for the SA according to the value received in the key lifetime attribute. The HA then sends an AAA Reply message (RP3), containing an AAA Generalized Key Reply Option and the Code field set to indicate SUCCESS (value 0), to the terminal. The AAA Generalized Key Reply Option does not contain the key K, but the Lifetime field is set to the value received in the key lifetime attribute and the value of the Key SPI field is set to indicate the Security Association between the HA and the terminal. When the terminal receives this message the general BU authentication key establishment procedure is completed.

In step 3-J, for the Mobile IPv4 application, the terminal will form the Mobile-Home Authentication Extension into the Mobile IPv4 Registration Request (RREQ), using the BSA's, as created from the key material. The HA will automatically apply the corresponding BSA to the MN-HA Authentication Extension when performing message authentication of the RREQ.

For the Mobile IPv6 application, the terminal will send IPSec protected binding updates to the HA, so that the R-UIM keyed IPSec security associations will automatically be applied to the sent packet. When the HA receives the packet, its IPSec module automatically knows the SA that it now can apply to the incoming mobility header packet. This packet can be the Mobile IPv6 HOTI or the Binding Update message.

In step 3-K, for the Mobile IPv4 application, the HA will apply the Mobile-Home Authentication Extension into the constructed Mobile IPv4 Registration Reply (RREP), using the BSA's, as created from the key material received from AS. The terminal will then automatically apply the corresponding BSA to the MN-HA Authentication Extension when performing message authentication of the received RREP.

For the Mobile IPv6 application, the IPSec module of HA will automatically protect the sent BAck message using the R-UIM keyed SA(s). Then, when receiving an IPSec-secured mobility header packet from HA, the terminal automatically applies the R-UIM keyed IPSec security association for the opposite direction compared to the one used in step N.

This completes a successful mobility signaling protection application protocol flow. With other applications than Mobile IP/IPv6 home registrations, this kind of a procedure can be used to key any IPsec SA.

In the following, a second embodiment of the present invention is described.

Similar to the first embodiment, the second embodiment is directed to the field of combined use of CDMA2000 cellular and non-cellular packet data networks, and specifically relates to user authentication and the authorization of services using a Removable User Identity Module (R-UIM) when communicating over multiple types of access networks. While no protocols currently exist to do R-UIM authentication over non-cellular IP networks, this capability is useful for automating key management leveraging on existing key infrastructure for non-data authentications, as has been shown with similar methods in other cellular environments. Authenticating the user and authorizing service allows the cellular operator to provide the user various access network types, while maintaining a unified service provisioning, user-based network access management, and roaming authorization, while leveraging all this from existing authentication/accounting/billing infrastructure. The benefit can be summarized as unification of smartcard-based CDMA2000 authentication for multiple access methods.

According to the second embodiment, various protocols are combined into a R-UIM based multi-access authentication and key distribution mechanism, runnable over IP on different link-layers. The system, using various encapsulation messages at different stages, allows the network elements to exchange data so that both the terminal equipment and the operator network can run the CDMA2000 CAVE (Cellular Authentication and Voice Encryption) algorithm for IP-based non-cellular and cellular packet data services. By using the exchanged data and the results of the CAVE algorithm, the terminal and access network can mutually authenticate each other, and derive secure keys that can be used for a limited-time applications, such as network access authorization or message protection of roaming signaling authentication. It is noted that the CAVE algorithm is further described in ANSI-TIA/EIA-41, "Cellular Radio Telecommunications Intersystem Operations", 1997, for example.

The terminal can perform IP-based authenticated sessions over heterogeneous network types, including CDMA2000, 802.11 Wireless LAN, Bluetooth, or Ethernet. The access network can be point-to-point, or point-to-multipoint. The terminal can combine running this method with Mobile Ipv6, or it can run it over a simple IPv6 access, one without mobility support.

In the non-cellular cases, according to the present second embodiment a uniform method is provided for the mobile equipment and operator network to communicate with each other over any IP-capable network, and securely exchange credentials and establish service provisioning, regardless of the characteristics of the underlying network used. The method, as described, is tied to the existing CDMA2000 method by sharing the registration identity only, so that using this method, operators are not required to re-tool each technology, but can leverage this more generic method when a link-layer specific mechanism is not used. By adding a few network elements, as described in this invention, the operator may leverage their existing CDMA2000 service infrastructure with little or no change to the existing network elements.

In the following, the procedure according to the second embodiment is described in more detail.

The embodiment is directed to mobile phones or other mobile devices (heretofore referred to as an ME or a mobile equipment), which have IP-based communication capabilities, usually over wireless links, and which has the R-UIM module. The embodiment can also be used with fixed devices in their startup but is most useful with mobile devices. The embodiment allows mutual authentication, network authorization, and service provisioning by a multi-party interaction involving (but not limited to) the following entities: ME, R-UIM (which is considered a separate entity by virtue of its internal processor, non-volatile memory, and private data and algorithms), Access Controller, Authentication Gateway, and the CDMA2000 network's Authentication Center (AuC/HLR (Home Location Register)), similar as in the first embodiment.

At the time the ME enters a network capable of GRASP (General R-UIM Authentication and Service Provisioning, the protocol example described in the present second embodiment) functionality, the ME receives a Router Advertisement, which includes an indication of GRASP support, e.g., a router or agent advertisement option from the local AC indicating this type of AAA support. This initiates the authentication, key generation, and service provisioning as described in this invention. Next, the ME responds to the AC with an EAP R-UIM/Start message containing a Client Identifier option and an EAP Identity option. Both options contain the user identity (IMSI@realm), which is constructed from the user's IMSI in the R-UIM, at ME startup time, and the realm in an extra file in the R-UIM or in the ME's non-volatile memory. This identity EAP message is encapsulated in IP/IPv6 as an access link AAA message. The access link AAA message can be, e.g., in UDP or ICMPv6 messages, as described in a best implementation case in Appendix A for IPv4 and IPv6, respectively, in a link-layer encapsulation, such as in IEEE 802.1x, IEEE 802.11i or in a suitable Bluetooth profile message, in PPP EAP encapsulation, or in any suitable last-hop PANA protocol message, as standardized in the future).

The AC determines the Authentication Server's IP address by mapping it from the IMSI and realm, and forwards the AAA message to the IP core using, e.g., RADIUS, or any other core AAA protocol such as DIAMETER, for its encapsulation transport. The message is then received by the AS, which then contacts the AuC/HLR.

The AS can be an AAA server which communicates directly or via the serving MSC with the AuC/HLR using SS7 or A1 messaging emulating voice circuit authentications. In other words, the AS would have a functionality to communicate with the AuC/HLR. With this architectural choice the existing CDMA network can stay unmodified, only an AS must be added. This is the non-intrusive overlay approach.

Alternatively, an approach with more tight integration would cause changes to the CDMA2000 network. The AS can be an AAA (RADIUS) client/broker in the PDSN, which forwards the authentications to a modified-to-standard Home AAA server (AAAH) in the CDMA2000 packet core network. The latter requires the AAAH have the functionality to communicate with the AuC/HLR, a modification to the CDMA2000 packet core. The latter architectural choice would give the possibility to use R-UIM authentications for native CDMA2000 packet data sessions via a PDSN, as is currently done with EAP-CHAP, or EAP-PAP, since those authentications terminate at the end of the PPP session at PDSN, and cause a RADIUS message exchange with the AAAH server. In other words, the latter alternative would broker non-cellular R-UIM authentications via the PDSN or directly to the home AAA server, or transfer cellular PPP-R-UIM authentications to the same endpoint, using extended PDSN RADIUS client capabilities. The extension would be the EAP-R-UIM capability and its mapping to RADIUS messages, potentially re-using the non-cellular RADIUS messaging for the described method.

When the AS receives a registration, it proceeds to retrieve randomized keying material from the AuC, in the form of a RAND or RANDU (depending on the global, or unique nature of the authentication being performed), and returns this random information as a challenge to the ME, in the form of an EAP R-UIM/Challenge message containing a client ID option, inside of an AAA Answer (which is transported over RADIUS).

Now, the ME has received the random challenge (RAND) from the AS, and is ready to run the CAVE algorithm in order to authenticate itself and generate encryption keys for the session. The ME sends a command to the R-UIM to start the Run CAVE algorithm, and provides the ESN (electronic serial number of the phone, determined and ME startup time), RAND/RANDU, rand type (unique or global, depending on what was supplied), and the PIN number, if necessary, for this R-UIM. The ME then runs Get Response, to get the R-UIM to pass the output AUTHR or AUTHU (global or unique challenge response) to the ME.

After the ME has received the challenge response, it sends it to the AC in a similar packet as described above, but it is an EAP/R-UIM/Start message with the Local Challenge, Client ID, and an embedded data option containing the challenge response material. The AC then looks up the AS's address as in the previous step, and forwards the message via RADIUS. The AS gets the message, and determines which AuC/HLR to contact by doing a mapping lookup based on the IMSI and Realm received in the identity suboption, and also retrieves its stored session state based on the IMSI@Realm. The AS proceeds to verify the authenticity of the client by retrieving CAVE credentials from the AuC/HLR, running the CAVE algorithm, and comparing the response received from the ME with the response received from AuC/HLR.

If the responses received from ME and AuC are equal, the AS forwards the session key and success code back to the AC in another EAP message. Upon receipt of this EAP message, the AC grants access to the ME and saves the session key for use during the session. This happens, e.g., by the core AAA client functionality in the AC. It keys an IPsec security association(s) with ME in the AC, or creates a firewall rule to grant access to the network for the ME.

The AC then transmits the message back to the ME, embedded in the last-hop AAA protocol as described previously (e.g., in ICMPv6), with the key suboption removed. Thus, the key is not transmitted over the last hop, which may be insecure, and the ME uses the key it derived in the R-UIM, and the AC uses the key transmitted back from the AS through RADIUS.

Figure 4A:
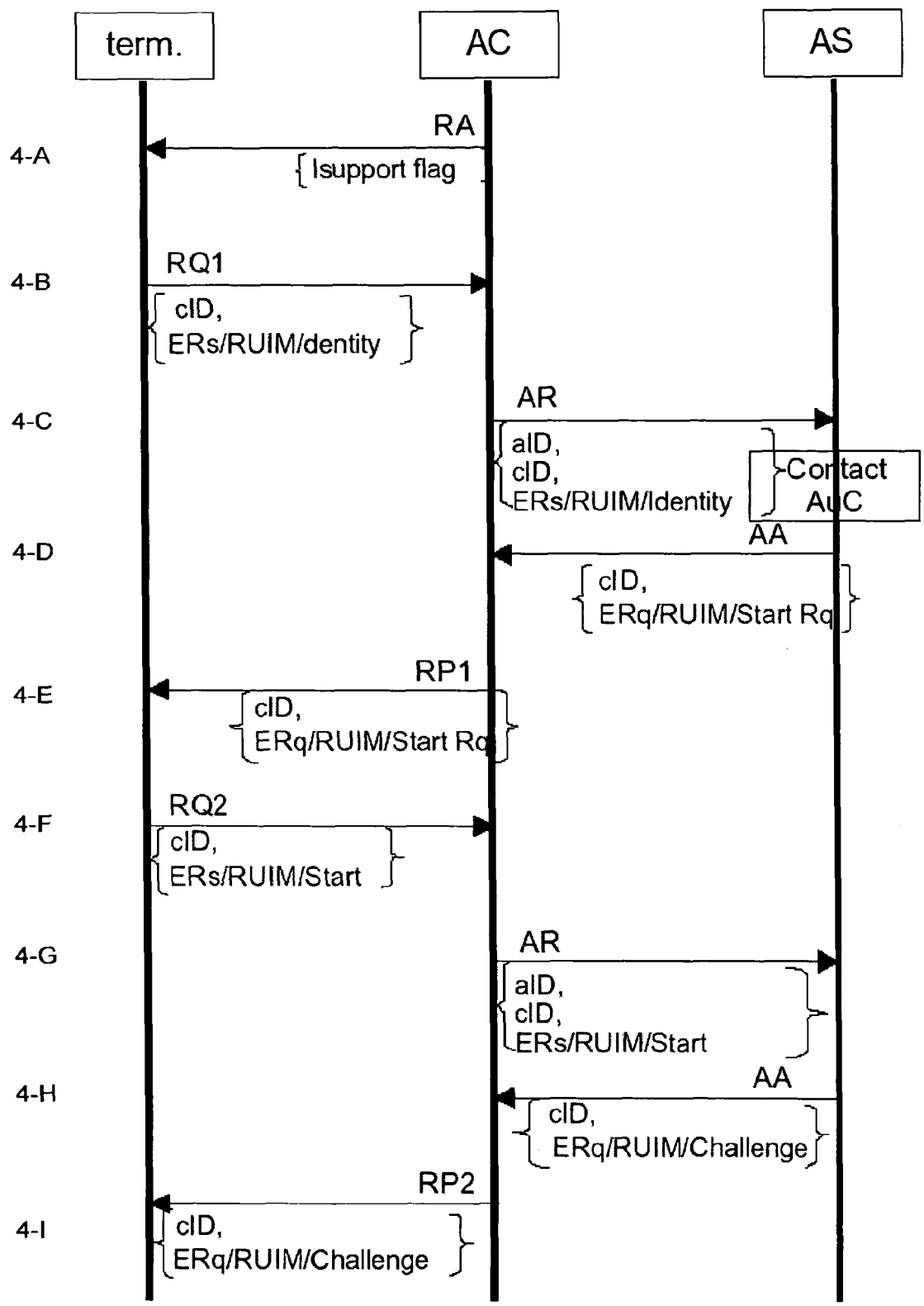
FIGS. 4A and 4B a signal flow according to a first example of a second embodiment of the invention.
Figure 4B:
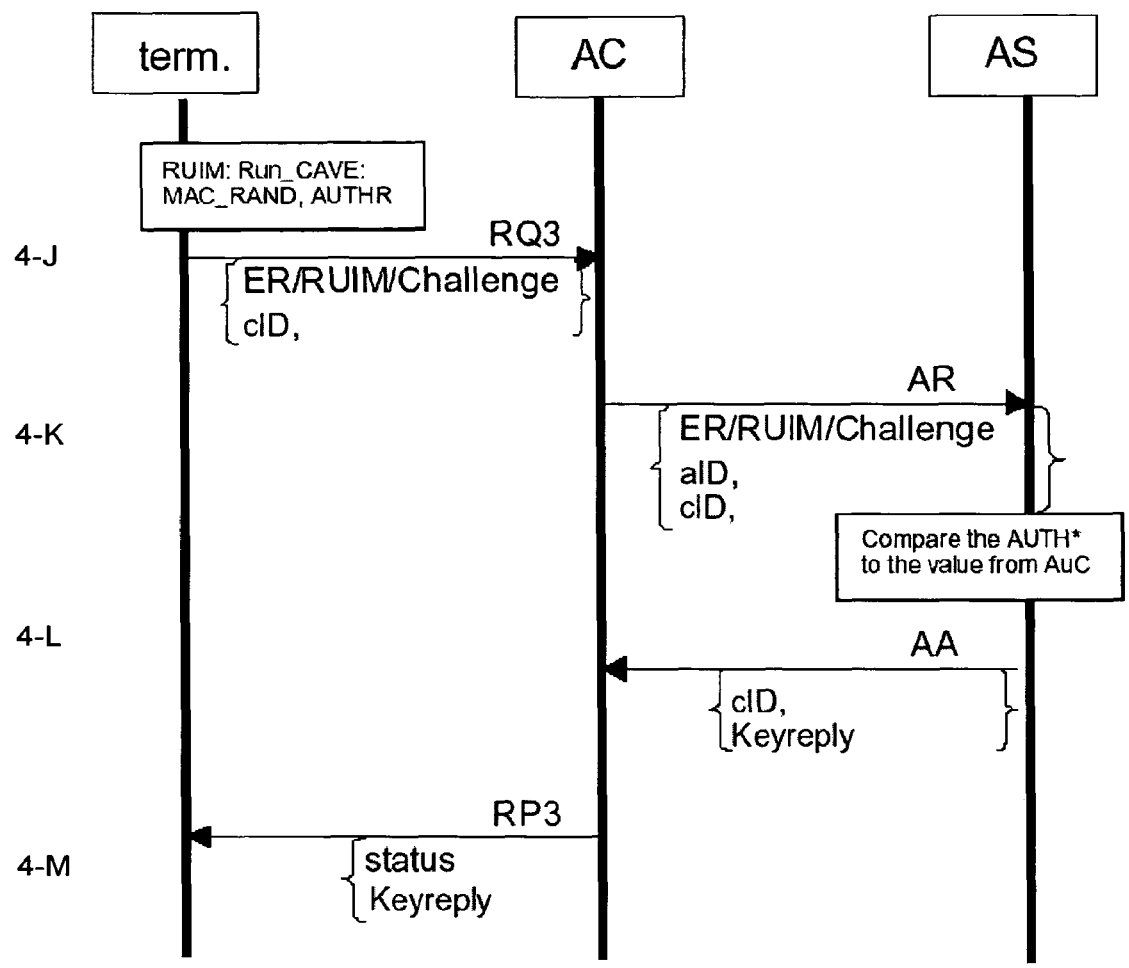

Next, the above procedure is described in more detail by referring to the signal flow diagram shown in FIGS. 4A and 4B. It is noted that this signal flow is similar to that shown in FIGS. 2A and 2B, so that abbreviations and the like described in connection with FIGS. 2A and 2B are not explained again.

In step 4-A, the terminal receives a Router Advertisement (either unsolicited or solicited) from the AC. The Router Advertisement (RA) includes a flag indicating AAA support. Before sending the following message, the terminal must have acquired an assigned IPv4 address, e.g., with DHCP.

In step 4-B, the terminal deducts from the presence of an AAA flag in the Router Advertisement that AAA access authentication needs to be performed. The terminal starts the authentication sequence by sending an AAA Request message (RQ1) to the AC. The AAA Request contains an AAA Client Identifier Option as well as an option carrying the EAP Identity message. Both the AAA Client Identifier Option and the EAP Identity message contain the NAI of the user (IMSI@realm).

In step 4-C, the AC derives the address of the AS from the NAI contained in the AAA Client Identifier Option (using DNS, if needed) and sends a AAA-Request (AR) message to the AS. The AR contains the EAP Identity message (in the EAP-Payload attribute) and the NAI (in the User-Name attribute) received in the AAA Client Identifier Option in step B.

In step 4-D, the AS performs the following upon receipt of the AR message in step 4-C:
It creates an EAP Request/R-UIM/StartRequest message indicating the start of the R-UIM authentication procedure.
It sends a AAA-Answer (AA) message, containing the EAP Request/R-UIM/Start (in the EAP-Payload attribute) and the NAI identifying the user (in the User-Name attribute), to the AC.

In step 4-E, the AC sends an AAA Reply message (RP1), containing the EAP Request/R-UIM/Start in the an Embedded Data Option and an AAA Client Identifier Option to the terminal. The AAA Client Identifier Option contains the NAI identifying the user.

In step 4-F, the terminal sends an AAA Request message (RQ1), containing an AAA Client Identifier Option containing the NAI (IMSI@realm) and an AAA Embedded Data Option carrying an EAP Response/R-UIM/Start message. The Reason field of the EAP Response/R-UIM/Start is set to 0 (zero), indicating that the session key will not be used for anything (only the CAVE authentication is performed).

In step 4-G, the AC derives the address of the AS from the NAI contained in the AAA Client Identifier Option (using DNS, if needed) and sends a AAA-Request (AR) message to the AS. The AR contains the EAP Response/R-UIM/Start message and the NAI (in the vendor-specific Radius attribute fields), as received in the AAA Client Identifier Option in step 4-F.

In step 4-H, the AS performs the following upon receipt of the AR message in step G:
Based on the IMSI part of the NAI, the AS identifies the AuC holding the authentication information for the user.
It asks and gets two Cave authentication triplets from the AuC.
It calculates the values MAC_RAND and MAC_AUTHR as the AT_RAND and AT_MAC, which are specified in H. Haverinen "EAP SIM Authentication (work in progress)" Internet Draft (draft-haverinen-pppext-eap-sim-10.txt), Internet Engineering Task Force, February 2003, for example, for this EAP-R-UIM.
It stores the value MAC_AUTHR for later usage.
It creates the EAP Request/R-UIM/Challenge message containing the MAC_RAND value and two RAND values (obtained from the authentication triplets).
It sends a AAA-Answer (AA) message, containing the EAP Request/R-UIM/Challenge and the NAI identifying the user (in the vendor-specific Radius attribute fields), to the AC.

In step 4-I, the AC sends an AAA Reply message (RP2), containing the EAP Request/R-UIM/Challenge in the AAA Embedded Data Option, an AAA Client Identifier Option containing the NAI.

In step 4-J, the terminal performs the following upon receipt of the AAA Reply in step 4-I:
It uses the R-UIM to calculate two AUTHR/AUTHU values, giving the two RAND values received inside the EAP Request/RUIM/Challenge as input to the R-UIM module.
It calculates the values MAC_RAND and MAC_AUTHR as the AT_RAND and AT_MAC which are specified in the above referenced document H. Haverinen "EAP SIM Authentication (work in progress)" Internet Draft (draft-haverinen-pppext-eap-sim-10.txt), Internet Engineering Task Force, February 2003, for example.
It compares the calculated MAC_RAND value to the value received in the EAP Request/R-UIM/Challenge. If the values match, the EAP Request/R-UIM/Challenge message is authenticated successfully, otherwise the message authentication fails.

It sends an AAA Request message (RQ3) containing an AAA Client Identifier Option (NAI of the form IMSI@realm) and an EAP Response/R-UIM/Challenge message in the AAA Embedded Data Option, to the AC. The EAP Response/R-UIM/Challenge contains the calculated MAC_AUTHR value.

In step 4-K, the AC sends an AR message to the AS (identified by the NAI). The AR message contains the EAP Response/R-UIM/Challenge and the NAI (in a vendor-specific Radius attribute field) as received in the AAA Client Identifier Option of the AAA Request.

In step 4-L, the AS performs the following upon receipt of the AR message in step K:

It compares the MAC_AUTHR value it has calculated in step 4-D to the MAC_AUTHR value contained in the EAP Response/RUIM/Challenge. If the values match, the CAVE authentication is successful; otherwise, the authentication fails.

It sends an AA message, containing the NAI identifying the user (in a Radius attribute field) to the AC and the Result-Code indicating success (Reply-Message Attribute in AA) or failure (Reply-Message Attribute in Access-Reject message) of the authentication, to the AC.

In step 4-M, the AC knows upon receipt of the AA message in step 4-L, whether the CAVE authentication was successful or not. If the authentication was successful, the AC sends an AAA Reply message with the Code field set to indicate SUCCESS (value 0), to the terminal. When the terminal receives this message, the OWLAN access network authentication is accomplished.

If the authentication was successful, the AC shall apply a filtering rule allowing packets sent from the authenticated terminal to pass. Alternatively, there can be a network access IPsec entry or entry pair created between the terminal and AC with this application (or another application code), using the same kind of a keying mechanism as explained for the Mobile IP/IPv6 application below.

Figure 5A:
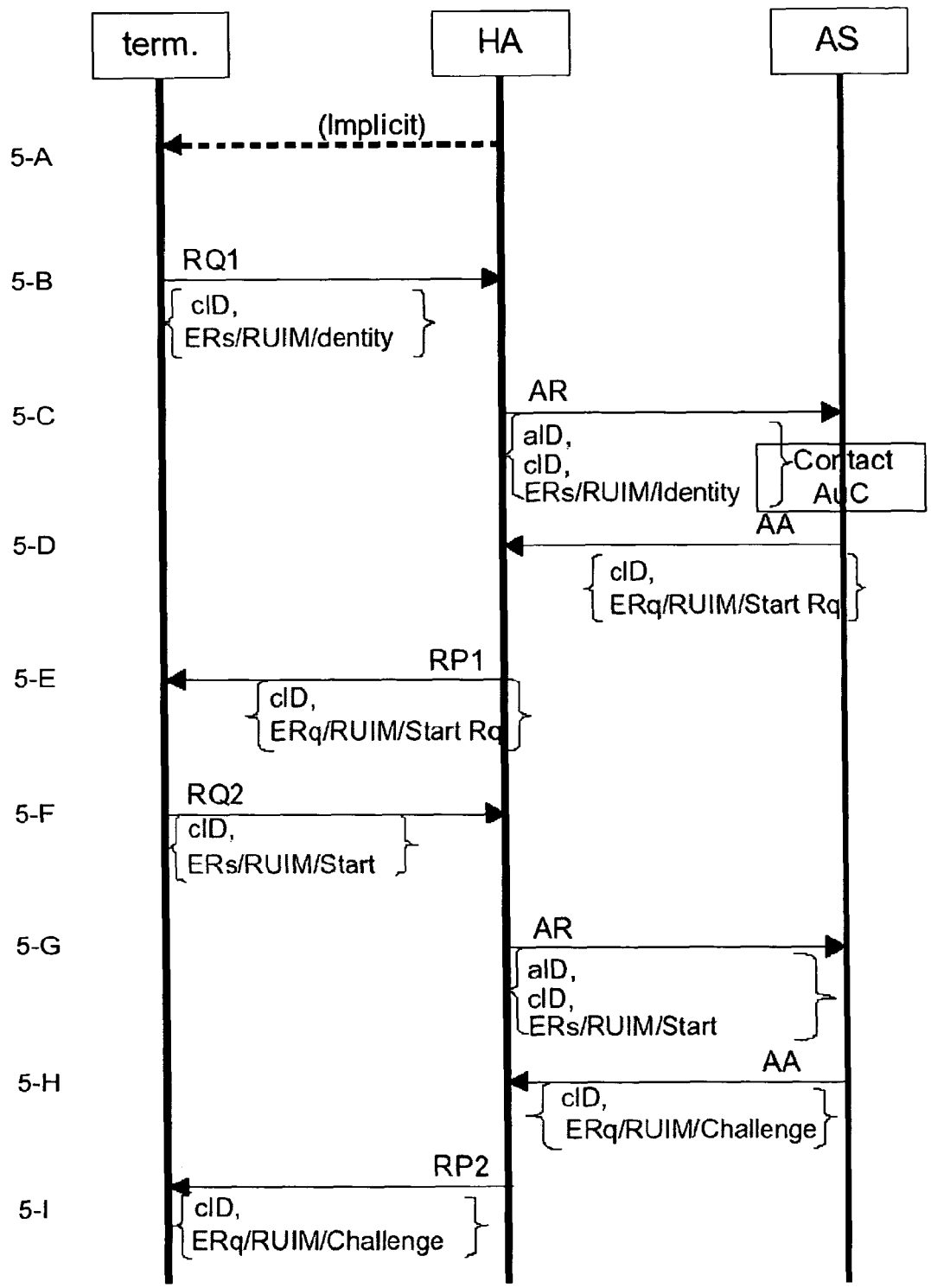
FIGS. 5A and 5B a signal flow according to a second example of the second embodiment of the invention, and FIGS. 6A, 6B and 6C an access controller, a mobile station and a router usable according to the embodiments of the invention.
Figure 5B:
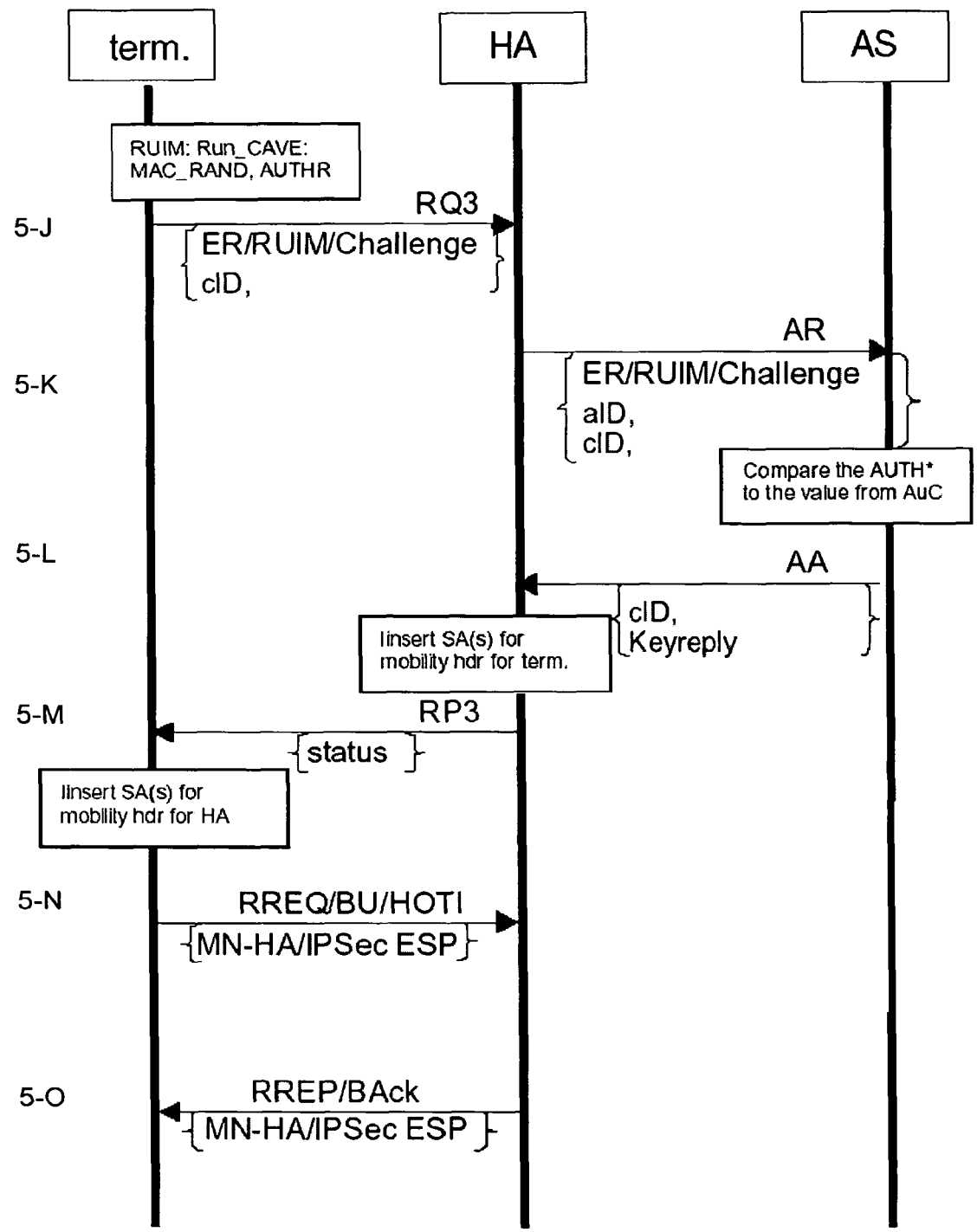

In a second case according to the second embodiment, signaling flow between MS, HA, and AS is described, using access link signaling (NAAP, PPP-LCP, or such), and core link signaling (Radius or DIAMETER), and EAP-R-UIM as the end-to-end signaling. The combined signaling is shown in FIGS. 5A and 5B.

In step 5-A, the terminal implicitly receives a knowledge of its HA being able to perform a R-UIM authentication. Before sending the following message, the terminal must have acquired an assigned IPv4 address, e.g., with DHCP.

In step 5-B, the terminal deducts from its static knowledge with its home network that binding authentication needs to be performed. The terminal starts the authentication sequence by sending an AAA Request message (RQ1) to the HA. The AAA Request contains an AAA Client Identifier Option as well as an option carrying the EAP Identity message. Both the AAA Client Identifier Option and the EAP Identity message contain the NAI of the user (IMSI@realm).

In step 5-C, the HA derives the address of the AS from the NAI contained in the AAA Client Identifier Option (using DNS, if needed) and sends a AAA-Request (AR) message to the AS. The AR contains the EAP Identity message (in the EAP-Payload attribute) and the NAI (in the User-Name attribute) received in the AAA Client Identifier Option in step 5-B.

In step 5-D, the AS performs the following upon receipt of the AR message in step C:

It creates an EAP Request/R-UIM/StartRequest message indicating the start of the R-UIM authentication procedure. In order to perform this, the AS also contacts the AuC (Authentication Center).

It sends a AAA-Answer (AA) message, containing the EAP Request/R-UIM/Start (in the EAP-Payload attribute) and the NAI identifying the user (in the User-Name attribute), to the HA.

In step 5-E, the HA sends an AAA Reply message (RP1), containing the EAP Request/R-UIM/Start Request in the Embedded Data Option and an AAA Client Identifier Option to the terminal. The AAA Client Identifier Option contains the NAI identifying the user.

In step 5-F, the terminal sends an AAA Request message (RQ2), containing an AAA Client Identifier Option containing the NAI (IMSI@realm) and an AAA Embedded Data Option carrying an EAP Response/R-UIM/Start message. The Reason field of the EAP Response/R-UIM/Start is set to 2 (binary 10), indicating that the session key will be used for home registration protection (the CAVE authentication will be performed after step I and Ipsec security associations are created for protecting mobility headers with HA after step M).

In step 5-G, the HA derives the address of the AS from the NAI contained in the AAA Client Identifier Option (using DNS, if needed) and sends an AAA-Request (AR) message to the AS. The AR contains the EAP Response/R-UIM/Start message and the NAI (in the vendor-specific Radius attribute fields), as received in the AAA Client Identifier Option in step F.

In step 5-H, the AS performs the following upon receipt of the AR message in step G:

Based on the IMSI part of the NAI, the AS identifies the AuC holding the authentication information for the user.

It asks and gets as many Cave authentication triplets from the AuC as needed. This is determined by keylength of the CAVE algorithm and the IPSec Cipher Profile Id used (one from the set as defined in IKE (Internet Key Exchange) v2). This profile Id is communicated in the EAP packet.

It calculates the values MAC_RAND and MAC_AUTHR as the AT_RAND and AT_MAC, which are specified in the above-referenced document H. Haverinen "EAP SIM Authentication (work in progress)" Internet Draft (draft-haverinen-pppext-eap-sim-10.txt), Internet Engineering Task Force, February 2003, for example, for this EAP-R-UIM.

It stores the value MAC_AUTHR for later usage.

It creates the EAP Request/R-UIM/Challenge message containing the MAC_RAND value and two RAND values (obtained from the authentication triplets).

It sends a AAA-Answer (AA) message, containing the EAP Request/R-UIM/Challenge and the NAI identifying the user (in the vendor-specific Radius attribute fields), to the HA.

In step 5-I, the HA sends an AAA Reply message (RP2), containing the EAP Request/R-UIM/Challenge in the AAA Embedded Data Option, an AAA Client Identifier Option containing the NAI.

In step 5-J, the terminal performs the following upon receipt of the AAA Reply in step 5-I:

It uses the R-UIM to calculate two AUTHR/AUTHU values, giving the two RAND values received inside the EAP Request/RUIM/Challenge as input to the Run_CAVE algorithm in the R-UIM module.

It calculates the values MAC_RAND and MAC_AUTHR as the AT_RAND and AT_MAC, which are specified in the above-referenced document H. Haverinen "EAP SIM Authentication (work in progress)" Internet Draft (draft-haverinen-pppext-eap-sim-10.txt), Internet Engineering Task Force, February 2003, for example.

It compares the calculated MAC_RAND value to the value received in the EAP Request/R-UIM/Challenge. If the values match, the EAP Request/R-UIM/Challenge message is authenticated successfully, otherwise the message authentication fails.

It sends an AAA Request message (RQ3), containing an AAA Client Identifier Option (NAI of the form IMSI@realm) and an EAP Response/R-UIM/Challenge message in the AAA Embedded Data Option, to the HA. The EAP Response/R-UIM/Challenge contains the calculated MAC_AUTHR value.

In step 5-K, the HA sends an AR message to the AS (identified by the NAI). The AR message contains the EAP Response/R-UIM/Challenge and the NAI (in a vendor-specific Radius attribute field) as received in the AAA Client Identifier Option of the AAA Request.

In step 5-L, the AS performs the following upon receipt of the AR message in step K:

It compares the MAC_AUTHR value it has calculated in step 5-D to the MAC_AUTHR value contained in the EAP Response/RUIM/Challenge. If the values match then the CAVE authentication is successful; otherwise, the authentication fails.

It sends an AA message, containing the NAI identifying the user (in a Radius attribute field) to the HA and the Result-Code indicating success (Reply-Message Attribute in AA) or failure (Reply-Message Attribute in AA) of the authentication, and a key reply (Cipher Profile Id, key(s), lifetime) to the HA.

In step 5-M, the HA knows upon receipt of the AA message in step 5-L, whether the CAVE authentication was successful or not. If the authentication was successful, the HA sends an AAA Reply message (RP3) with the Code field set to indicate SUCCESS (value 0) to the terminal. When the terminal receives this message, the OWLAN home registration authorization and keying is done. If the R-UIM authentication was successful, the HA shall key for the Mobile IPv4 application, a Binding Security Association (BSA) to be used with the MN-HA Authentication Extension to the appropriate Mobile IPv4 state from the key material obtained when running the Run_CAVE algorithm in the RUIM.

for the Mobile IPv6 application, two IPSec security associations to the SADB from the key material obtained when running the Run_CAVE algorithm in the R-UIM. These SA's (Security Associations) are set up for incoming and outcoming registration (MIPv4) or mobility header (MIPv6) packets with the terminal, and with the other parameters as identified by the used IPSec Cipher Profile Id. This action possibly uses the Pfkey interface of the IPSec module hence not requiring any special interface between the R-UIM keying daemon and the IPSec module.

In step 5-N, for the Mobile IPv4 application, the terminal will form the Mobile-Home Authentication Extension into the Mobile IPv4 Registration Request (RREQ), using the BSA's, as created from the key material. The HA will automatically apply the corresponding BSA to the MN-HA Authentication Extension when performing message authentication of the RREQ.

Moreover, in step 5-N, for the Mobile IPv6 application, the terminal will send IPSec protected binding updates to the HA, so that the R-UIM keyed IPSec security associations will automatically be applied to the sent packet. When the HA receives the packet, its IPSec module automatically knows the SA that it now can apply to the incoming mobility header packet. This packet can be the Mobile IPv6 HOTI (Home Test Init) or the Binding Update (BU) message.

In step 5-O, for the Mobile IPv4 application, the HA will apply the Mobile-Home Authentication Extension into the constructed Mobile IPv4 Registration Reply (RREP), using the BSA's, as created from the key material received from AS. The terminal will then automatically apply the corresponding BSA to the MN-HA Authentication Extension when performing message authentication of the received RREP.

Moreover, for the Mobile IPv6 application, the IPSec module of HA will, in step 5-O, automatically protect the sent Back (Binding Acknowledgement) message using the R-UIM keyed SA(s). Then, when receiving an IPSec-secured mobility header packet from HA, the terminal automatically applies the R-UIM keyed IPSec security association for the opposite direction compared to the one used in step N.

This completes a successful mobility signaling protection application protocol flow. With other applications than Mobile IP/IPv6 home registrations, this kind of a procedure can be used to key any IPsec SA.

The invention as described in the above embodiments can be implemented in a software or embedded hardware system or chip elements, running on various network entities involved in the exchange. Important functionalities of the implementation in a terminal are: access to an API for standard R-UIM functions, and the ability to construct arbitrary IP packets including encapsulated addresses. In the Access controller, important functions are packet encapsulation and decapsulation into access AAA messages, such as UDP or ICMPv6, and core AAA messages, such as RADIUS or DIAMETER messages, e.g., adapting from the NASREQ application (as described in P. Calhoun, W. Bulley, A. Rubens, J. Haag, G. Zorn. Diameter NASREQ Application (work in progress). Internet Draft (draft-ietf-aaa-diameter-nasreq-08.txt), Internet Engineering Task Force, November 2001, for example). Also, it would re-use generic packet filtering capabilities of an access router, Network Access Server, or PDSN, depending on where the access authentication service point for the method is located.

The best mode of implementation of the second embodiment is outlined in FIG. 1. This would be to implement the terminal functionality in a mobile device, which interfaces with the R-UIM hardware (in case of the second embodiment) as well as with the network. The functionality would send and receive GRASP protocol messages with the IP access router, access server, or base station to which the mobile device connects over the radio network. When the mobile device has received messages from the network elements that supply input information (a challenge, or RAND) to the authentication algorithm, it will access the R-UIM to run the CAVE algorithm. This locally generates a response and a shared secret with the network.

In the network, the invention can be implemented by additional software on the access router/WLAN base station, to accept encapsulated messages from the mobile equipment, and re-encapsulate them in the server-based RADIUS protocol, for transit back to the operator's network. An optional Mobile IP Home Agent with additional software is added to the operator's network, and additionally a gateway (AS or AAAH) is used to translate messages between RADIUS and the CDMA2000 SS7 messages. In this way, the security of the CAVE protocol is confined to the confines of the ME and AuC/HLR, and existing infrastructure in the CDMA2000 network is re-used for authentication and authorization, possibly even for billing and accounting. Thus, no or minimal changes are needed to the IP or CDMA2000 networks.

The functional implementation can occur in various places of operating systems, for instance in the OS (Operating System) kernels, or in user-level software, depending on the implementation specifics.

Figure 6A:
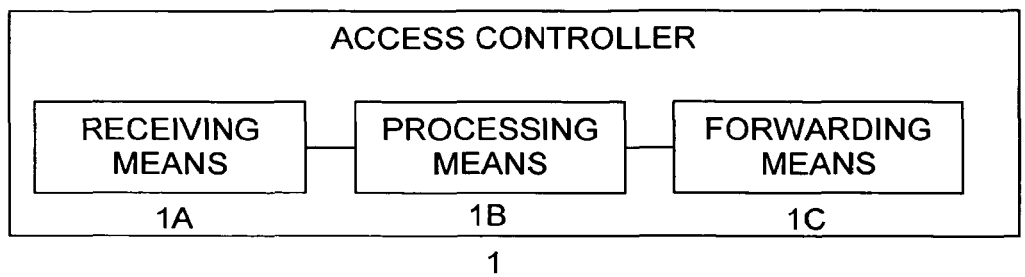

In the following, the network elements involved a shortly described by referring to FIGS. 6A to 6C. It is noted that only those means are described which are necessary for the description of the above embodiments FIG. 6A shows an access controller (AC) according to the above embodiments. The access controller 1 comprises a receiving means 1a, which receives an authentication message in which a start message described above is encapsulated. Furthermore, the access controller comprises a processing means 1b. The processing means 1b reads the encapsulated start message (e.g., client identifier option message and a EAP (Extensible Authentication Protocol) identity option message, which contain client type, user identity, and core address information, as described above). The encapsulated message is then forwarded by a forwarding means 1c to an authentication server identified in the encapsulated message.

Figure 6B:
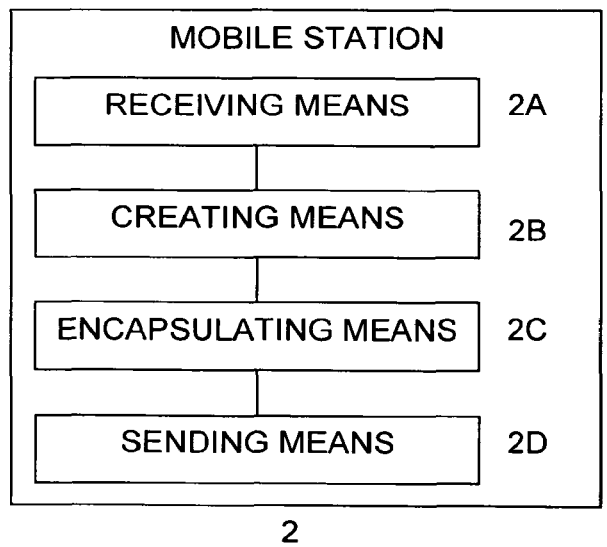

FIG. 6B shows a mobile terminal 2. It is noted that the mobile terminal is only an example for a subscriber device. The mobile terminal 2 comprises a determining means 2a which determines a network access type upon receipt of an information message (i.e. router advertisement RA described above) which indicates at least one network access type. Furthermore, the mobile terminal 3 comprises a creating means 2b which creates the start message as described above. An encapsulating means 2c of the mobile station 2 encapsulates the start message in an authentication message compatible with an access network identified in the information message, and a sending means 2d of the mobile station 2 sends the start message to an access controller.

Figure 6C:
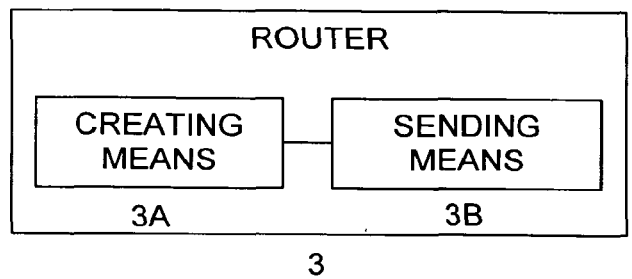

FIG. 6c shows a router 3 as used in the above embodiments. The router 3 comprises a creating means 3a which creates the information message described above, i.e., a Router Advertisement. A sending means 3b of the router 3 sends the information message to a subscriber device. It is noted that router 3 and the access controller 1 may be arranged in one unit (as according to the embodiments described above).

The invention is not limited to the embodiments described above but can vary within the scope of the claims.

For example, the above embodiments can be freely combined, such that EAP-AKA authentication mechanism using USIM and an authentication using R-UIM based on the CAVE algorithm are both used.

A protocol between the mobile device and the access network may comprise at least one of network layer protocols like UDP, ICMP, ICMPv6 and link-layer protocols like IEEE 802.1x, IEEE 802.11i, and a Bluetooth profile.

Furthermore, the following variations of the embodiments described above exist:

1. Re-use of EAP-SIM Method

The method, where an authentication mechanism is a mechanism using R-UIM (as described above with respect to the second embodiment, for example), is embedded in the same protocol encapsulation as the method for SIM, called EAP-SIM. This usage is re-using the EAP-SIM protocol for the carrying of the R-UIM-based authentication with the CAVE algorithm.

An indication of the alternate use of EAP-SIM may be indicated using a reserved field in the EAP-SIM protocol, or alternatively, an additional attribute, call it AT-R-UIM.

2. Location of Network-Side Termination for the Smartcard Algorithms

The network side termination point of the algorithm corresponding to the one run on the smartcard (CAVE or AKA secret algorithm), could in principle be either in the HLR/AuC, or co-located in the Home AAA server AAAH (FIG. 1). In the former case there exists an interface call it G_h, through which the home AAA server propagate dialogues for the triplet/quintuplet to the smartcard algorithm in question, using a cellular network protocol over G_h.

Furthermore, it is noted that the mobile terminal or device is only an example for a subscriber terminal. It is noted that the term "mobile" does not only mean that the mobile terminal is connected to a network via a radio link, but also a terminal which may be connected to different network access means via fixed cables, for example. For example, this may include a computer which can be connected to fixed network terminals such as a computer which may be connected to a fixed network in hotel rooms, trains and the like.

The invention claimed is:

1. An apparatus comprising:
   at least one processor; and
   at least one memory including computer program code, the at least one processor, the at least one memory, and the computer program code configured to cause the apparatus to at least:
   receive a message in which a start message containing at least a user identity and authentication data is encapsulated, the message being compatible with an access network corresponding to a network access type determined from an information message previously transmitted by the apparatus, wherein the start message initiates authentication regardless of which of a plurality of network access types is determined;
   read the encapsulated message; and
   transmit the encapsulated message to an authentication server identified in the encapsulated message.

2. The apparatus according to claim 1, wherein the start message contains a client identifier option message and an extensible authentication protocol support identity option message, wherein the message contains at least information regarding at least one of client type, user identity, and core address information.

3. The apparatus according to claim 1, wherein the apparatus is provided in a home agent of a mobile device which has sent the start message.

4. The apparatus according to claim 1, wherein the information message is sent to a subscriber device indicating at least one network access type.

5. The apparatus according to claim 4, wherein the information message includes a router advertisement.

6. The apparatus to claim 4, wherein the information message indicates extensible authentication protocol support.

7. The apparatus according to claim 4, wherein the information message is issued when the mobile device enters a network.

8. A method comprising:
   receiving a message in which a start message containing at least a user identity and authentication data is encapsulated, the message being compatible with an access network corresponding to a network access type determined from an information message that was previously transmitted, wherein the start message initiates authentication regardless of which of a plurality of network access types is determined;

reading the encapsulated message; and transmitting the encapsulated message to an authentication server identified in the encapsulated message.

9. The method according to claim 8, wherein the start message contains a client identifier option message and an extensible authentication protocol support identity option message, wherein the message contains at least information regarding at least one of client type, user identity, and core address information.

10. The method according to claim 8, wherein the method is provided in a home agent of a mobile device which has sent the start message.

11. The method according to claim 8, wherein the information message is sent to a subscriber device indicating at least one network access type.

12. The method according to claim 11, wherein the information message includes a router advertisement.

13. The method to claim 11, wherein the information message indicates extensible authentication protocol support.

14. The method according to claim 11, wherein the information message is issued when the mobile device enters a network.

15. A non-transitory computer-readable medium encoded with instructions that, when executed by at least one processor, perform at least the following:

receiving a message in which a start message containing at least a user identity and authentication data is encapsulated, the message being compatible with an access network corresponding to a network access type determined from an information message that was previously transmitted, wherein the start message initiates authentication regardless of which of a plurality of network access types is determined;

reading the encapsulated message; and transmitting the encapsulated message to an authentication server identified in the encapsulated message.

* * * * *